United States Patent
Chan et al.

(10) Patent No.: US 12,169,876 B2
(45) Date of Patent: Dec. 17, 2024

(54) OPTIMIZING PARTIAL WRITES TO COMPRESSED BLOCKS

(71) Applicants: ADVANCED MICRO DEVICES, INC., Santa Clara, CA (US); ATI TECHNOLOGIES ULC, Markham (CA)

(72) Inventors: Anthony H C Chan, Markham (CA); Christopher J. Brennan, Boxborough, MA (US); Mark Fowler, Boxborough, MA (US); David Chui, Markham (CA); Leon K. N. Lai, Markham (CA); Jimshed Mirza, Markham (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/564,138

(22) Filed: Dec. 28, 2021

(65) Prior Publication Data

US 2023/0206380 A1   Jun. 29, 2023

(51) Int. Cl.
| | |
|---|---|
| *G06T 1/20* | (2006.01) |
| *G06T 7/10* | (2017.01) |
| *G06T 7/90* | (2017.01) |
| *G06T 15/00* | (2011.01) |
| *H04N 1/60* | (2006.01) |
| *H04N 19/13* | (2014.01) |
| *H04N 19/59* | (2014.01) |

(52) U.S. Cl.
CPC .................. *G06T 1/20* (2013.01); *G06T 7/10* (2017.01); *G06T 7/90* (2017.01)

(58) Field of Classification Search
CPC ....... G06T 15/005; G06T 15/80; G06T 15/04; G06T 9/00; G06T 1/20; G06T 7/10; G06T 7/90; G06F 12/0875; G06F 2212/401; G06F 2212/1016; G06F 2212/302; H04N 19/59; H04N 19/182; H04N 19/186; H04N 19/132; H04N 19/176; H04N 19/46; H04N 19/593; H04N 1/415; H04N 1/60
USPC ........................................................ 345/426
See application file for complete search history.

(56) References Cited

U.S. PATENT DOCUMENTS

| | | | | |
|---|---|---|---|---|
| 6,108,460 | A * | 8/2000 | Rich | G06T 1/20 |
| | | | | 358/448 |
| 10,062,143 | B2 * | 8/2018 | Brennan | G06T 9/00 |
| 11,153,578 | B2 * | 10/2021 | Patel | H04N 19/59 |
| 2012/0320067 | A1 * | 12/2012 | Iourcha | G06T 1/20 |
| | | | | 345/501 |
| 2014/0146872 | A1 * | 5/2014 | Du | H04N 19/423 |
| | | | | 375/240.2 |

(Continued)

FOREIGN PATENT DOCUMENTS

| | | | | |
|---|---|---|---|---|
| EP | 3340176 A1 * | 6/2018 | ......... | G06F 12/0875 |
| EP | 3340176 B1 * | 6/2019 | ......... | G06F 12/0875 |
| WO | WO-2018119131 A1 * | 6/2018 | ......... | G06F 12/0875 |

*Primary Examiner* — Wesner Sajous

(57) ABSTRACT

A processor for optimizing partial writes to compressed blocks is configured to identify that a write request targets less than an entirety of a compressed block of pixel data, identify, based on a compression key, a compressed segment of the compressed block of pixel data that includes a target of the write request, and decompress, responsive to the write request, only the identified compressed segment of the compressed block of pixel data.

20 Claims, 8 Drawing Sheets

(56) References Cited

U.S. PATENT DOCUMENTS

| | | | |
|---|---|---|---|
| 2015/0070380 A1* | 3/2015 | Lum | G06T 11/40 |
| | | | 345/612 |
| 2017/0256025 A1* | 9/2017 | Abraham | G06T 15/005 |
| 2018/0089091 A1* | 3/2018 | Akenine-Moller | |
| | | | G06F 12/0207 |
| 2018/0182155 A1* | 6/2018 | Mirza | G06T 9/00 |
| 2020/0142604 A1* | 5/2020 | Moore | G06F 3/0661 |
| 2021/0099251 A1* | 4/2021 | Podlozhnyuk | H03M 13/1111 |
| 2022/0129430 A1* | 4/2022 | Trimble | H04L 69/04 |
| 2022/0342755 A1* | 10/2022 | Vedpathak | G06F 11/1044 |

* cited by examiner

OPTIMIZING PARTIAL WRITES TO COMPRESSED BLOCKS

BACKGROUND

A graphics processing unit (GPU) is a complex integrated circuit that is configured to perform graphics-processing tasks. For example, a GPU executes graphics-processing tasks required by an end-user application, such as a video-game application. In various implementations, the GPU is a discrete device or is included in the same device as another processor, such as a central processing unit (CPU). A GPU produces the pixels that make up an image from a higher level description of its components in a process known as rendering. GPUs typically utilize a concept of continuous rendering by the use of computing elements to process pixel, texture, and geometric data. These computing elements are often referred to as shaders, shader processors, shader arrays, shader units, or shader engines.

Much of the processing involved in generating complex graphics scenes involves texture data. Textures can be any of various types of data, such as color, transparency, lookup tables, image data, bump maps, or other data. In some implementations, textures are digitized images to be drawn onto geometric shapes to add visual detail. A large amount of detail, through the use of textures, are mapped to the surface of a graphical model as the model is rendered to create a destination image. The purpose of texture mapping is to provide a realistic appearance on the surface of an object.

The use of textures can consume large amounts of storage space and bandwidth, and consequently textures are compressed to reduce storage space and bandwidth utilization. Compressing textures and surfaces reduces storage and bandwidth costs on the graphics system while retaining as much of the quality of the original textures and surfaces as possible. For example, compression is utilized to decrease the amount of data fetched from memory or cache for processing by the GPU. When the GPU generates an output image, the GPU compresses these surfaces to reduce the memory/cache bandwidth and utilization. Typically, a software application will decompress at least a portion of an output image prior to updating any part of that portion of the output image. However, in a scene being rendered by the GPU, sometimes only a portion of a scene needs to be updated as the scene changes over time. However, the process for updating portions of a compressed resource can be inefficient. Accordingly, improved techniques for managing compressed resources are desired.

DETAILED DESCRIPTION

Figure 1:
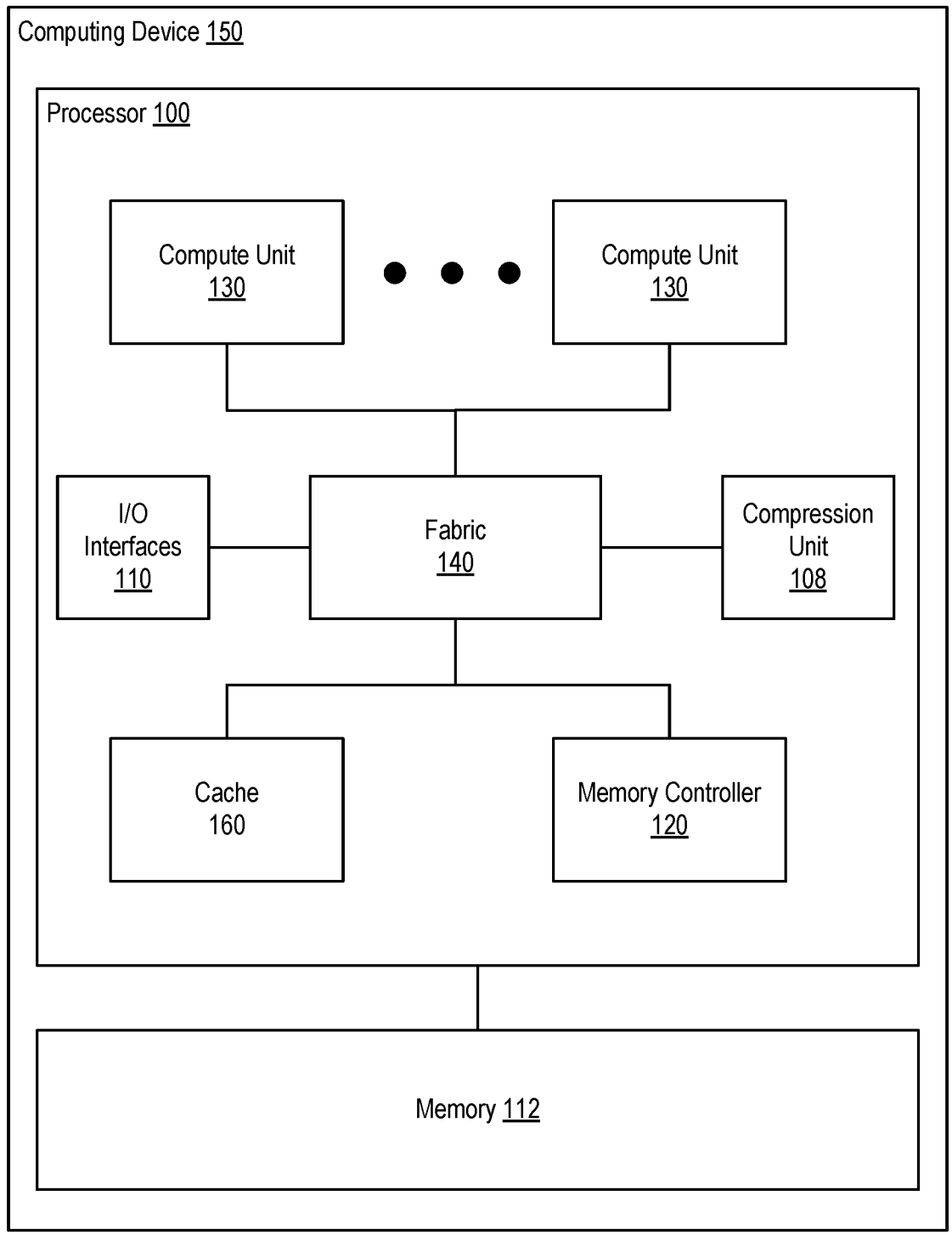
FIG. 1 is a block diagram of an example computing device for optimizing partial writes to compressed blocks in accordance with some implementations of the present disclosure.

An implementation is directed to an apparatus for optimizing partial writes to compressed blocks. The apparatus includes a processor configured to identify that a write request targets less than an entirety of a compressed block of pixel data. In some implementations, the processor includes a mapping unit that is configured to identify that a write request targets less than an entirety of a compressed block of pixel data. In implementations, the processor is configured to identify, based on a compression key, a compressed segment of the compressed block of pixel data that includes a target of the write request. In some implementations, the processor includes a mapping unit that is configured to identify, based on the compression key, the compressed segment of the compressed block of pixel data that includes the target of the write request In implementations, the processor is further configured to decompress, responsive to the write request, only the identified compressed segment of the compressed block of pixel data. In some implementations, the processor includes a decoder that is configured to decompress, responsive to the write request, only the identified compressed segment of the compressed block of pixel data. In some implementations, the compressed segment is one of two or more compressed segments that make up the compressed block of pixel data. In some implementations, the compressed block of pixel data is compressed using delta color compression. In some implementations, the compressed block of pixel data is a block of a compressed surface.

In some implementations, the processor is further configured to read the compressed segment from memory without reading any other compressed segment of the compressed block of pixel data. In some implementations, the processor is further configured to store decompressed pixel data from the compressed segment in a cache location and merge, responsive to the write request, write data of the write request with the decompressed pixel data to create merged data. In some implementations, the processor is further configured to compress the merged data to form an updated compressed segment. In some implementations, the processor is further configured to overwrite the compressed segment of the compressed block of pixel data with the updated compressed segment at a location in memory.

In some implementations, the processor is further configured to identify that a compressed size of a block of pixel data is larger than a preconfigured threshold, partition the block of pixel data into two or more segments, compress the block of pixel data by individually compressing each of the two or more segments, and generate, based on the partitioning, the compression key for the compressed block of pixel data. In implementations, the processor includes an encoder configured to identify that the compressed size of the block of pixel data is larger than the preconfigured threshold, partition the block of pixel data into the two or more segments, compress the block of pixel data by individually compressing each of the two or more segments, and generate, based on the partitioning, the compression key for the compressed block of pixel data.

In implementations, an apparatus includes a processor configured to identify that a compressed size of a block of pixel data is larger than a preconfigured threshold. In implementations, the processor is also configured to partition the block of pixel data into two or more segments. In implementations, the processor is further configured to compress the block of pixel data by individually compressing each of the two or more segments. In implementations, the processor is also configured to generate, based on the partitioning, a compression key for the compressed block of pixel data. In implementations, the processor includes an encoder configured to identify that the compressed size of the block of pixel data is larger than the preconfigured threshold, partition the block of pixel data into the two or more segments, compress the block of pixel data by individually compressing each of the two or more segments, and generate, based on the partitioning, the compression key for the compressed block of pixel data.

In some implementations, the processor is further configured to identify that a write request targets less than an entirety of the compressed block of pixel data. In these implementations, the processor is configured to identify, based on the compression key, a compressed segment of the compressed block of pixel data that includes a target of the write request. In these implementations, the processor is further configured to decompress, responsive to the write request, only the identified compressed segment of the compressed block of pixel data. In some implementations, the compressed segment is one of two or more compressed segments that make up the compressed block of pixel data. In some implementations, the compressed block of pixel data is compressed using delta color compression. In some implementations, the compressed block of pixel data is a block of a compressed surface.

In some implementations, the processor is further configured to read the compressed segment from memory without reading any other compressed segment of the compressed block of pixel data. In some implementations, the processor is further configured to store decompressed pixel data from the compressed segment in a cache location and merge, responsive to the write request, write data of the write request with the decompressed pixel data to create merged data. In some implementations, the processor is further configured to compress the merged data to form an updated compressed segment. In some implementations, the processor is further configured to overwrite the compressed segment of the compressed block of pixel data with the updated compressed segment at a location in memory.

In some implementations, a method for optimizing a partial write to a compressed block is disclosed. The method includes identifying that a write request targets less than an entirety of a compressed block of pixel data. The method also includes identifying, based on a compression key, a compressed segment of the compressed block of pixel data that includes a target of the write request. The method further includes decompressing, responsive to the write request, only the identified compressed segment of the compressed block of pixel data. In some implementations, the compressed segment is one of two or more compressed segments that make up the compressed block of pixel data. In some implementations, the compressed block of pixel data is compressed using delta color compression. In some implementations, the compressed block of pixel data is a block of a compressed surface.

In some implementations, the method also includes reading the compressed segment from memory without reading any other compressed segment of the compressed block of pixel data. In some implementations, the method further includes storing decompressed pixel data from the compressed segment and merging, responsive to the write request, write data of the write request with the decompressed pixel data to create merged data.

In some implementations, the method also includes compressing the merged data to form an updated compressed segment. In some implementations, the method also includes overwriting the compressed segment of the compressed block of pixel data with the updated compressed segment at a location in memory.

In some implementations, the method also includes identifying that a compressed size of a block of pixel data is larger than a preconfigured threshold, partitioning the block of pixel data into two or more segments, compressing the block of pixel data by individually compressing each of the two or more segments, and generating, based on the partitioning, the compression key for the compressed block of pixel data.

Implementations in accordance with the present disclosure will be described in further detail beginning with FIG. 1. Like reference numerals refer to like elements throughout the specification and drawings. FIG. 1 sets forth a block diagram of an example computing device 150 for optimizing partial writes to compressed blocks in accordance with some implementations of the present disclosure. In various implementations, the example computing device 150 of FIG. 1 is a laptop or desktop personal computer, a server, a mobile device such as a smart phone or tablet, a gaming console, and so on. In the example of FIG. 1, the computing device 150 includes a processor 100 coupled to a memory 112. In some implementations, the processor 100 embodies a graphics processing unit (GPU). In implementations, the processor 100 is a discrete GPU or an accelerated processing unit (APU) that includes one or more central processing units (CPUs) and an integrated GPU.

In the example of FIG. 1, the processor 100 includes two or more compute units 130. In some implementations, the two or more compute units are configured to execute graphics pipeline operations such as draw commands, pixel operations, geometric computations, and other operations for rendering an image to a display. In some implementations, the compute units 130 are configured to execute operations unrelated to graphics. In some implementations, the compute units 130 are configured to execute both graphics operations and non-graphics related operations. The two or more compute units are coupled to a cache 160 by a communications fabric 140. In some implementations, the cache 160 is a last level cache and is part of a cache subsystem that includes a cache controller and other cache logic.

In some implementations, the processor 100 includes one or more compression units 108. In some implementations, the compression unit 108 includes an encoder and decoder configured to compress and/or decompress a cache line, data block, pixel data, or other form of data using a compression algorithm (e.g., delta color compression (DCC), adaptive scalable texture compression (ASTC), base-delta-immediate (BDI) compression, etc.). In some examples, the compression unit 108 is utilized to compress data before sending it to memory 112 to conserve traffic on a memory bus as well as to conserve storage within the memory 112.

In some implementations, the processor 100 also includes I/O interfaces 110 coupled to the fabric 140, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). In implementations, various types of peripheral devices are coupled to I/O interfaces 110. Such peripheral devices can include, but are not limited to, displays, keyboards, mice, printers, scanners, joysticks or other types of game controllers, media recording devices, external storage devices, network interface cards, and so forth.

In some implementations, the processor 100 includes one or more memory controllers 120 coupled to the fabric 140. The memory controller 120 dispatches memory commands related to memory requests issued by the compute units 130. The memory controller is coupled to the memory 112 by a memory bus utilized to transfer data between the processor 100 and memory 112.

In some implementations, memory 112 is a random-access memory (RAM) for use with processor 100 during operation. In implementations, the RAM is static RAM (SRAM), dynamic RAM (DRAM), or any other volatile or non-volatile RAM. The type of DRAM that is used to implement memory 112 includes, but is not limited to, double data rate (DDR) DRAM, DDR2 DRAM, DDR3 DRAM, and so forth.

Figure 2:
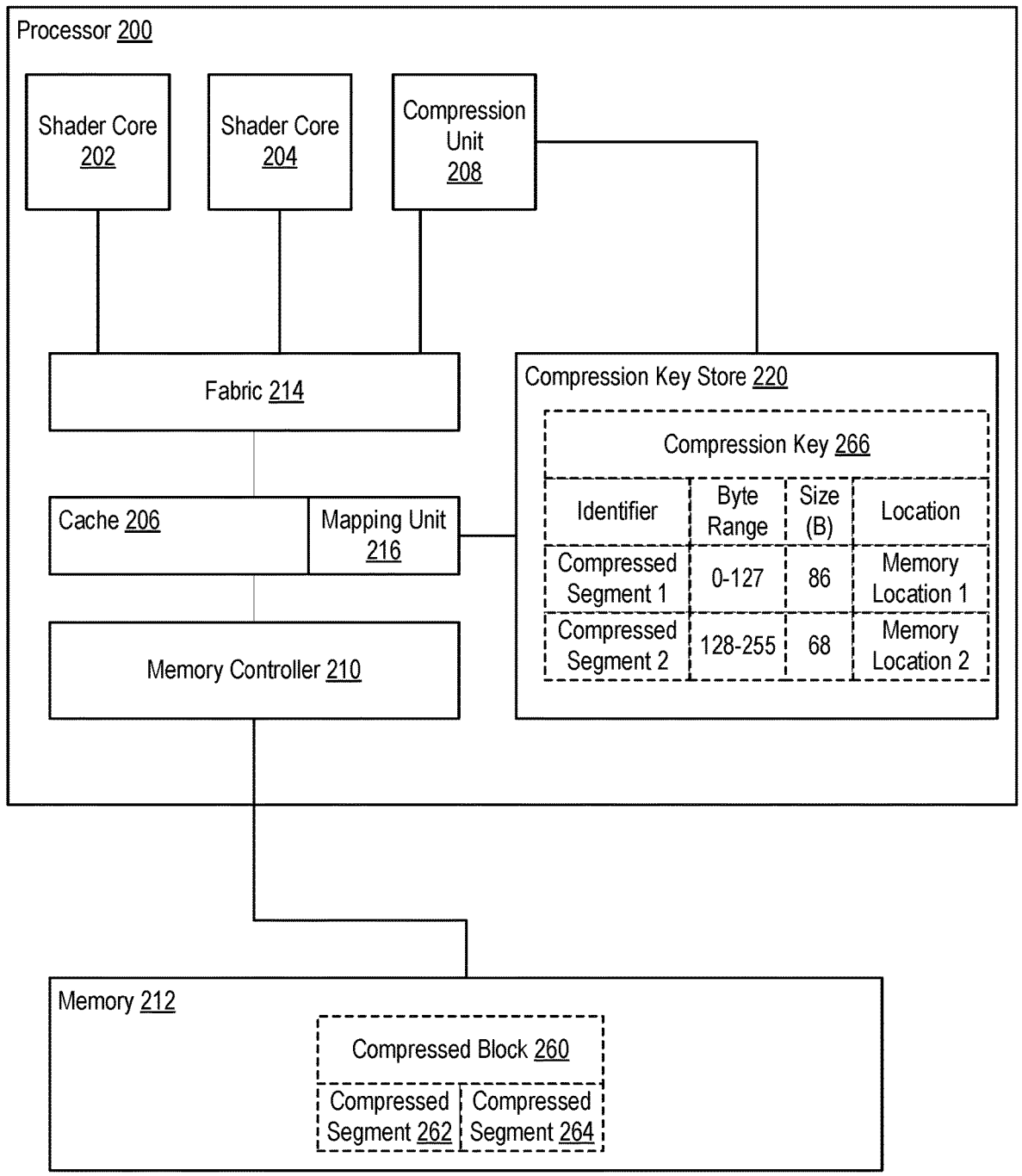
FIG. 2 a block diagram of another example computing device for optimizing partial writes to compressed blocks in accordance with some implementations of the present disclosure.

For further explanation, FIG. 2 sets forth an example block diagram of processor components for optimizing partial writes to compressed blocks in accordance with some implementations of the present disclosure. The example processor 200 of FIG. 2 includes two or more shader cores 202, 204 (e.g., the compute units 130 of FIG. 1). In some examples, the shader cores 202, 204 are representative of any number and type of shader compute resources which are included in the processor 200. In implementations, the shader cores 202, 204 include various compute resources for performing geometry, vertex, pixel, and/or other shading operations to render graphics. In implementations, the compute resources include components for fetching and decoding instructions, one or more arithmetic logic units for performing arithmetic calculations, and other resources. The shader cores 202, 204 are coupled to a cache 206 via a processor fabric 214 that provides communications links to various processor components. In implementations, cache 206 is a last level cache that is shared by all of the shader cores 202, 204 and through which the shader cores 202, 204 issue read and write requests to memory 212. When a read request is issued by a shader core 202, 204, data is read from memory 212 into the cache 206 via a memory controller 210 of the processor 200 if the requested data is not present in the cache 206. In response to a write request, a cache line in the cache 206 that includes a target of the write request is updated with write data in the write request. In some examples, in accordance with cache flush and eviction policies, data in the cache 206 is written to memory 212 via the memory controller 210. In some examples, the shader cores 202, 204 issue write requests that write pixel data. In implementations, the pixel data is organized into pixel data blocks for the purpose of rendering and manipulation. In some examples, the memory 212 is similar to the memory 112 of FIG. 1.

The example processor 200 of FIG. 2 also includes a compression unit 208 coupled to the fabric 214. In some examples, the compression unit 208 is configured to compress and/or decompress a cache line, data block, pixel data, or other form of data using a compression algorithm. In some implementations, data generated by the shader cores 202, 204 or other clients is compressed prior to writing the data to memory 112 to reduce data traffic on a memory bus between the processor and memory. To compress data, compression unit 208 receives an uncompressed bitstream (e.g., cache line or other data block) and compresses the uncompressed bitstream using, for example, delta color compression. Delta color compression (DCC) is a lossless form of compression that divides the uncompressed bitstream into a plurality of data blocks of fixed size (e.g., 256 bytes), where a single pixel in each data block is written using a normal representation of the pixel in the data block (a base value). The remaining pixels in the data block are encoded as a difference from the base value (delta values). Thus, the output of delta color compression is a compressed data block that includes at least a base value and delta values. The delta values are stored at a lower precision than the original pixels, requiring fewer bits of data to represent each pixel, and thereby reducing the data used to represent a given data block. In some implementations, other types of compression techniques are used by the compression unit 208 for compression, such as, for example, base-delta-immediate (BDI) compression, that also generate base values and delta values during compression.

In some examples, DCC is used to compress surfaces of a rendered graphic, in that a block of pixel data for a surface is compressed using DCC to conserve the amount of bandwidth required to transfer the pixel data to and from memory 212. For example, pixel data representing a surface of brick sidewalk is generated and saved to memory. When a frame of animation requires that a brick sidewalk be rendered, the pixel data representing the surface of a brick sidewalk is retrieved from memory and used to render the frame. To reduce the amount of memory traffic needed to render each frame, the pixel data representing the surface is compressed into what is referred to as a compressed surface. The pixel data representing the surface is compressed in units or blocks of a fixed size. In one example, each 256-byte block of pixel data is compressed using DCC before being written to memory.

In implementations, a shader core 202, 204 issues a partial write associated with a compressed surface. In one example, a partial write request is a write that modifies only a portion of the data in the 256-byte block of pixel data for a compressed surface. For example, to render a frame that includes a brick sidewalk as it begins to rain, only a portion of the pixel data for the surface needs to be modified to include a rain drop. However, the 256-byte block itself cannot be updated because it has been compressed into a compressed block that is smaller than 256 bytes. Thus, the compressed pixel data is decompressed first to make the modification.

In some implementations, the compression unit 208 is configured with a maximum size for a compressed block of data. For example, the maximum size relates to a cache line width, a bus width, or some other implementation dependent aspect of the processor or interface between the processor and memory 212. When a block of data cannot be compressed to a size that is within the threshold of the maximum size, the compression unit 208 should discard the compressed block and either leave the data uncompressed or take a secondary action. In one example, for a particular bitstream of pixel data, the compression unit 208 compresses the stream of pixel data in 256-byte blocks of the pixel data using DCC. For example, the pixel data is representative of a texture or surface for a rendered image. In this particular example, consider that the preconfigured threshold for a compressed block of data is 128 bytes. If the 256-byte block of uncompressed pixel data cannot be compressed to a size equal to or less than 128 bytes, the 256-byte block of uncompressed pixel data is left uncompressed or compressed in another manner.

In some implementations, the compression unit 208 includes logic configured to determine that a block of uncompressed pixel data cannot be compressed to a size that is equal to or less than the size of the preconfigured threshold for a maximum size of a compressed block of data. For example, the compression unit 208 compresses the block pixel data and then determines whether the size of the compressed block of pixel data is larger than the threshold. If the size of the compressed block of pixel data is larger than the threshold, the compressed block of pixel data is discarded. The logic is further configured to partition the block of uncompressed pixel data into multiple segments and compress each segment individually. For example, for a 256-byte block of uncompressed pixel data, the compression unit partitions the block into, for example, two 128-byte segments of the block of pixel data. In some examples, after compressing each segment, the compression unit determines whether each compressed segment is within the preconfigured threshold. In some implementations, if any of the compressed segments also fail to satisfy the threshold requirement, the compression unit 208 applies a different or additional partitioning that further reduces the size of each segment, and the compression is retried for each segment. Alternatively, the compression unit 208 assembles the compressed data differently in an attempt to satisfy the threshold.

When the compression unit 208 has arrived a set of compressed segments for the block of pixel data that each individually satisfy the threshold for the maximum size of a compressed block, the result is a compression of the block of data that includes two or more compressed segments. Thus, the compressed block of data is made up of two or more compressed segments of the uncompressed block of data. The compressed block of data, embodied by the two or more compressed segments, is then written to storage such as the cache 206 or the memory 212. For example, the compression unit 208 writes the compressed block of pixel data to a cache location or write the compressed block directly to memory 212.

In some implementations, the compression unit 208 generates or updates a compression key for the block of data. In implementations, the compression key includes data that defines the segments and/or describes how the block was compressed. For example, in some implementations, a compression key includes one or more of 1) an identifier for the block of data, 2) the type of compression that was used to compress the block of data, 3) the number of compressed segments for the block of data, 4) a size of each compressed segment 5) a byte range of the uncompressed block of data that is found in each compressed segment, 6) partitioning data, and/or 7) a memory location of one or more segments. It will be recognized that, in various other implementations, the compression key describes the partitioning of a compressed block of pixel data in other ways, and that a compression key for a block of pixel data includes more or less detail about how the block of data was compressed. In some implementations, the compression key is persisted in a compression key store 220 that is accessible by the cache 206 and/or other components of the processor. In some examples, the compression key store 220 includes compression keys for many compressed blocks of pixel data.

Consider an example, as depicted in FIG. 2 for illustration and not limitation, where the compression unit 208 compresses a 256-byte block of pixel data ('block A') by partitioning the block into two 128-byte segments and compressing each segment individually. The result is a compressed block 260 that is made up of two compressed segments 262, 264. The compressed block 260 is stored, for example, in memory 212. In this example, the compression unit 208 generates a compression key 266 that identifies block A as the subject of the compression key 266 and further identifies a first compressed segment ('compressed segment 1') and a second compressed segment ('compressed segment 2'). For the first compressed segment, the compression key 266 identifies a byte range of the uncompressed block of pixel data (e.g., '0-127'), a compressed segment size in bytes (e.g., '86'), and a memory location (e.g., 'memory_location_1') where the compressed segment is stored. For the second compressed segment the compression key 266 identifies a byte range of the uncompressed block of pixel data (e.g., '128-255'), a compressed segment size in bytes (e.g., '68'), and a memory location (e.g., 'memory_location_2') where the compressed segment is stored.

In some implementations, the cache 206 includes a mapping unit 216 configured to map an uncompressed block of pixel data to a segmented compressed block of pixel data. In implementations, the mapping unit may be implemented in hardware as a circuit, in software or a combination thereof. In some examples, the cache 206 receives a write request from, for example, a shader 202, 204 that overwrites the entirety of a block of pixel data that has been stored as a compressed block. In these examples, the compression unit 208 compresses the write data and overwrites the compressed block without first decompressing it. However, in other examples, the cache 206 receives a write request from a shader 202, 204 that includes a partial write to a compressed block of data. In one example, the partial write overwrites a subset of the bytes beginning at a block offset with write data included in the write request. For example, for a 256-byte block of pixel data, the partial write overwrites bytes 40-59 with 20 bytes of write data identified in the write request. In some implementations, the mapping unit 216 includes logic configured to determine that the write request targets less than the entirety of the compressed block of pixel data based on information (e.g., write size, block offset, write length, etc.) in the write request. For example, if the size of the pixel data associated with the write request is equal to the fixed size of an uncompressed block of pixel data, then the write request targets the entirety of the compressed block of pixel data. In this case, the compressed block of pixel data is not decompressed. Instead, the pixel data associated with the write request is compressed and this compressed pixel data is used to overwrite the original compressed block of pixel data. However, if the write request specifies an offset in the block of pixel data, or if the size of the pixel data associated with the write request is less than the fixed size of an uncompressed block of data, then the mapping unit 216 determines that the write request targets less than the entirety of the compressed block of pixel data.

In some implementations, the mapping unit 216 includes logic configured to identify the target of the write request with respect to a location within the uncompressed block of pixel data. For example, when it is determined that the write request targets less than the entirety of the compressed block of pixel data (i.e., that the write request is a partial write to the compressed block of pixel data), logic in the mapping unit 216 identifies which portion of the uncompressed block of pixel data is modified by the write request. In implementations, the identifying is performed by examining the write request to identify a location in the uncompressed block of pixel data that is modified by the write request. For example, the mapping unit 216 identifies an address, byte range, and/or offset within the uncompressed block of pixel data that is associated with the write request. In implementations, the identifying is further performed by mapping the portion of the uncompressed block of pixel data that is modified by the write request to a compressed segment of the compressed block of pixel data. For example, the mapping unit 216 locates a compression key associated with the compressed block of pixel data and examines the compression key to determine which compressed segment of the compressed block of pixel data includes the pixel data that is modified by the write request. For example, where compression is performed on 256-byte blocks of pixel data, the mapping unit 216 identifies that the partial write targets bytes 40-59 of block A, leaving bytes 0-39 and bytes 60-255 unmodified. In some implementations, to avoid decompressing the entire compressed block of pixel data to perform the partial write, the mapping unit 216 reads the compression key for a compressed block of data to identify a compressed segment that includes the target of the partial write. For example, in implementations, the mapping unit examines the compression key to locate the segment that includes the byte range of the uncompressed block of pixel data that targeted by the partial write. Per the example above, the mapping unit 216 identifies from the compression key 266 that the first compressed segment, with a byte range of 0-125, includes the target of a partial write directed to bytes 40-59 of the block. In this example, the compressed segment is retrieved and decompressed so bytes 40-59 from the partial write is merged with the remaining bytes of the compressed segment. However, in another example, the mapping unit 216 determine that the partial write targets all 128 bytes of the compressed segment. In such an example, the compression unit simply compresses the write data associated with the write request and overwrites the compressed segment with the compressed write data. In this manner, the compressed segment does not need to be decompressed.

In some examples, the mapping unit 216 determines whether the identified compressed segment is already in the cache 206, for example, by a tracking table that tracks compressed blocks or compressed segments already in the cache 206. In some examples, the mapping unit 216 reads the compressed segment from memory 212 into the cache 206. In some implementations, the mapping unit 216 reads only the compressed segment responsive to the partial write request, and does not read other compressed segments of the compressed block, thus reducing memory traffic. In other implementations, the mapping unit 216 causes the compression unit 208 to read the compressed segment into a buffer of the compression unit 208.

In some implementations, the compression unit 208 decompresses only the compressed segment of the compressed block of pixel data that includes the target of the partial write request. In these implementations, no other portions of the compressed block are decompressed, thus improving performance. In one example, the compression unit 208 decompresses the compressed segment using DCC. The decompressed pixel data from the compressed segment is written to a cache location in furtherance of performing the partial write. Continuing the above examples, the decompressed pixel data includes 128 bytes of the original block of pixel data, where that 256-byte block was partitioned into 128-byte segments prior to compression.

In some implementations, the cache 206 carries out the partial write by merging the write data associated with the write request with the decompressed pixel data. Continuing the above examples, where a partial write targets bytes 40-59 of block A with 20 bytes of write data, the cache 206 overwrites bytes 40-59 of block A with the 20 bytes of write data, leaving bytes 0-39 and bytes 60-127 unmodified. In some implementations, the decompressed pixel data is read out of the cache and merged with the write data associated with the write request.

In some implementations, the compression unit 208 recompresses the merged data. In other words, the compression unit 208 generates an updated compressed segment. The updated compressed segment is written back to the cache 206 or to memory 212. The updated compressed segment overwrites the original compressed segment that was stored in the cache 206 or in memory 212. Thus, the updated compressed segment, together with other compressed segments of the compressed block of pixel data, represents a compressed block of pixel data to which a partial modification has been applied without decompressing the entire compressed block of pixel data.

However, in another example, the mapping unit 216 might determine that the partial write targets all 128 bytes of the compressed segment. In such an example, the compression unit 208 simply compresses the write data associated with the write request and overwrite the compressed segment with the compressed write data. In this manner, the compressed segment does not need to be decompressed.

Although the mapping unit 216 is illustrated in FIG. 2 as being included in the cache 206, it should be recognized that the mapping unit 216 is not limited to such a configuration. For example, the mapping unit could be included in a memory controller, a cache coherency unit, or some other processor component. Similarly, although the compression unit 208 is illustrated in FIG. 2 as being a standalone unit, it should be recognized that the compression unit may be integrated with a shader 202, 204, the cache 206, or some other processor component. In implementations, the compression and/or decompression is performed by a shader 202, 204.

Figure 3:
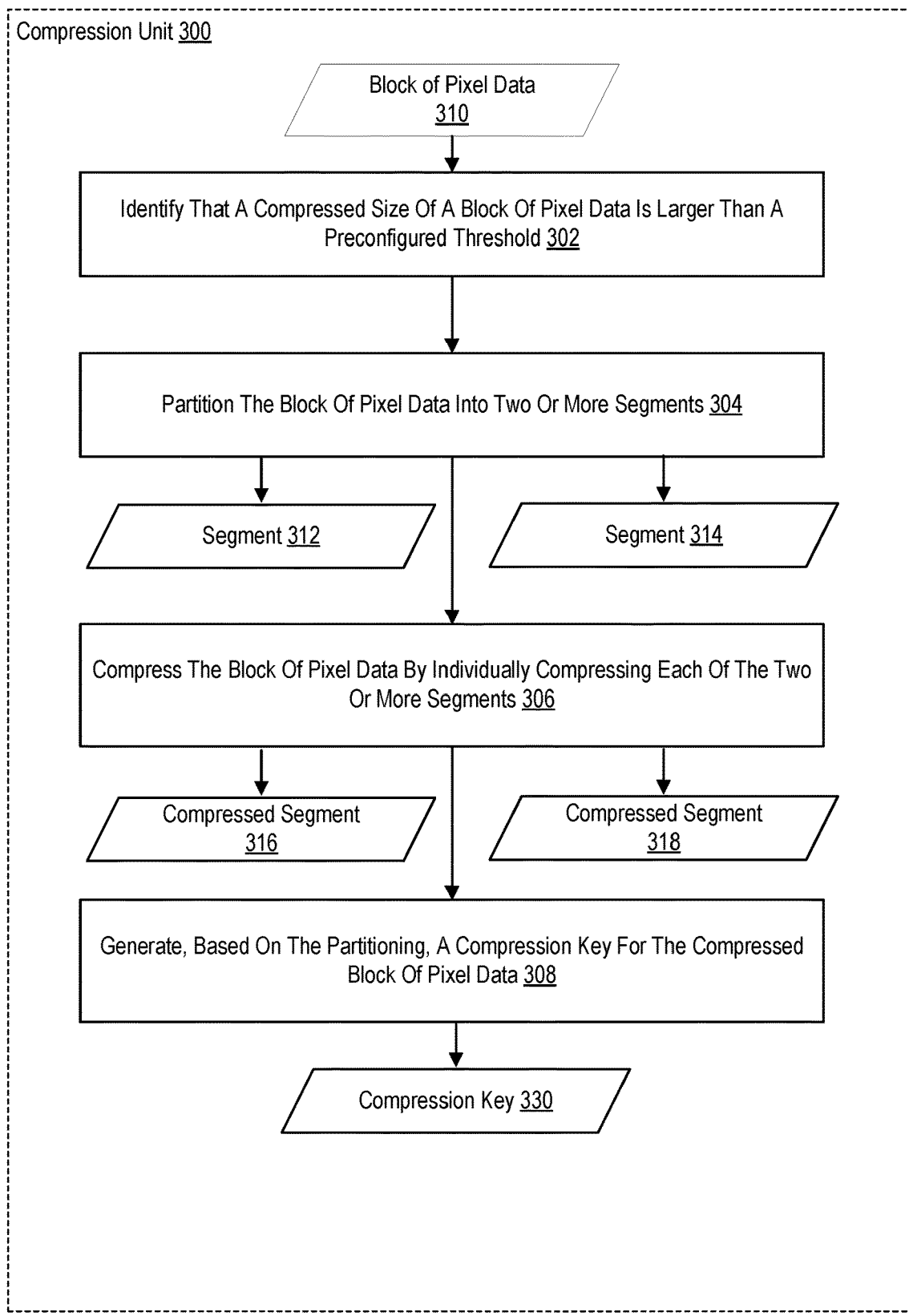
FIG. 3 is a flowchart of an example method of optimizing partial writes to compressed blocks according to some implementations of the present disclosure.

For further explanation, FIG. 3 sets forth a flow chart illustrating an example method of optimizing partial writes to compressed blocks in accordance with some implementations of the present disclosure. The example of FIG. 3 includes compression unit 300 (e.g., any of compression units discussed above). In one example implementation, the compression unit 300 is configured to compress a cache line, data block, pixel data, or other form of data using a compression algorithm such as, for example, delta color compression. The compression unit 300 is further configured to decompress compressed data using the compression algorithm.

The method of FIG. 3 includes identifying 302 that a compressed block size of a block 310 of pixel data is larger than a preconfigured threshold. In some implementations, a compression unit 300 receives the block 310 of pixel data that that is to be compressed and written to a storage region such as a cache or memory. For example, the block 310 of pixel data is received from a shader unit, a color block unit, or other components of a processor. In some examples, the block 310 of pixel data corresponds to a unit of texture data. For example, the texture data is used to compose a surface of an artifact in a rendered graphic frame. In some implementations, the compression unit 300 is configured to receive blocks of data of a fixed size. In one variation, the fixed size is 256 bytes. For example, the fixed size relates to DCC, which compresses 256-byte blocks of pixel data. In other variations, the fixed size includes other amounts of data. In some examples, the compression unit 300 is configured with a threshold size for a resulting compressed block of data. That is, the size of the compressed block of data is restricted to a preconfigured maximum size.

In some implementations, only a certain amount of space is allocated for storing a compressed block of data. In these implementations, the value of the threshold is set equal to the size of the memory footprint which is allocated for a compressed block of data. In one example, there are 256 bytes of received pixel data and the preconfigured threshold is 128 bytes. In such an example, 128 bytes is the amount of space allocated for storing a compressed block of data. In other examples, the size of the received pixel data and/or the threshold is some other number of bytes. In some examples, the compression unit 300 compresses the block 310 of data and identifies the size of the compressed block of data. If the size of the compressed block of data is less than or equal to the threshold, then the compression unit 300 stores the compressed block of data in the storage region. However, if the size of the compressed block of pixel data is larger than the threshold, the compressed block of pixel data is discarded and a partitioning of the block of pixel data is undertaken.

The method of FIG. 3 also includes partitioning 304 the block 310 of pixel data into two or more segments. In some implementations, the compression unit 300 separates the block 310 of pixel data into multiple segments that are compressed individually when compression of the entire block 310 of pixel data will not satisfy the threshold for compressed block size. In some examples, the compression unit selects a segment size that will result in a compressed block size that is within the threshold. For example, where the input block size is 256 bytes, the compression unit 300 partitions the block 310 into a 128-byte lower segment 312 and a 128-byte upper segment 314. Where the compressed block size threshold is 128 bytes, a compression of either of the lower segment 312 or the upper segment 314 will result in a compressed block size that is 128 bytes or less, thus satisfying the threshold. However, as previously mentioned, the compressed block size threshold can be implementation dependent. Consider another example where the compressed block size threshold is 64 bytes. In such an example, it can be the case where the compressed size of a 128-byte segment is too large to satisfy this threshold. In this case, the compression unit 300 will select a new segment size that is smaller than 128-bytes, resulting in three or more segments. In such an example, the compression unit 300 retries the compression of the partitioned segments to determine whether the compressed size of each segment is within the compressed block size threshold.

The example of FIG. 3 also includes compressing 306 the block 310 of pixel data by individually compressing each of the two or more segments 312, 314. In some implementations, the compression unit 300 compresses one segment 312 to create a compressed segment 316 before compressing the next segment 314 to create a compressed segment 318. In some examples, the compression unit 300 includes a DCC encoder, as described above, for compressing the segments 312, 314.

The example of FIG. 3 also includes generating 308, in accordance with the partitioning, a compression key 330 for the compressed block of pixel data. In some implementations, the compression unit 300 creates metadata for the block 310 of pixel data that includes information about the partitioning of the block such as the size of each segment 312, 314, a byte range of the block 310 pixel data corresponding to each compressed segment 316, 318, the compressed size each compressed segment 316, 318, and/or a physical address in the storage region where each the compressed segment 316, 318 is stored. In some examples, the compression unit 300 stores a compression key 330 containing this metadata in a data store. The data store stores compression keys for many different compressed surface blocks. In some implementations, the data store is included in storage resources of cache memory, system memory, or some other data buffer. In some examples, the compression key 330 is accessible in the data store by an array of shader units as well as other GPU components such as rasterizers, color block units, depth units, and so on.

Figure 4:
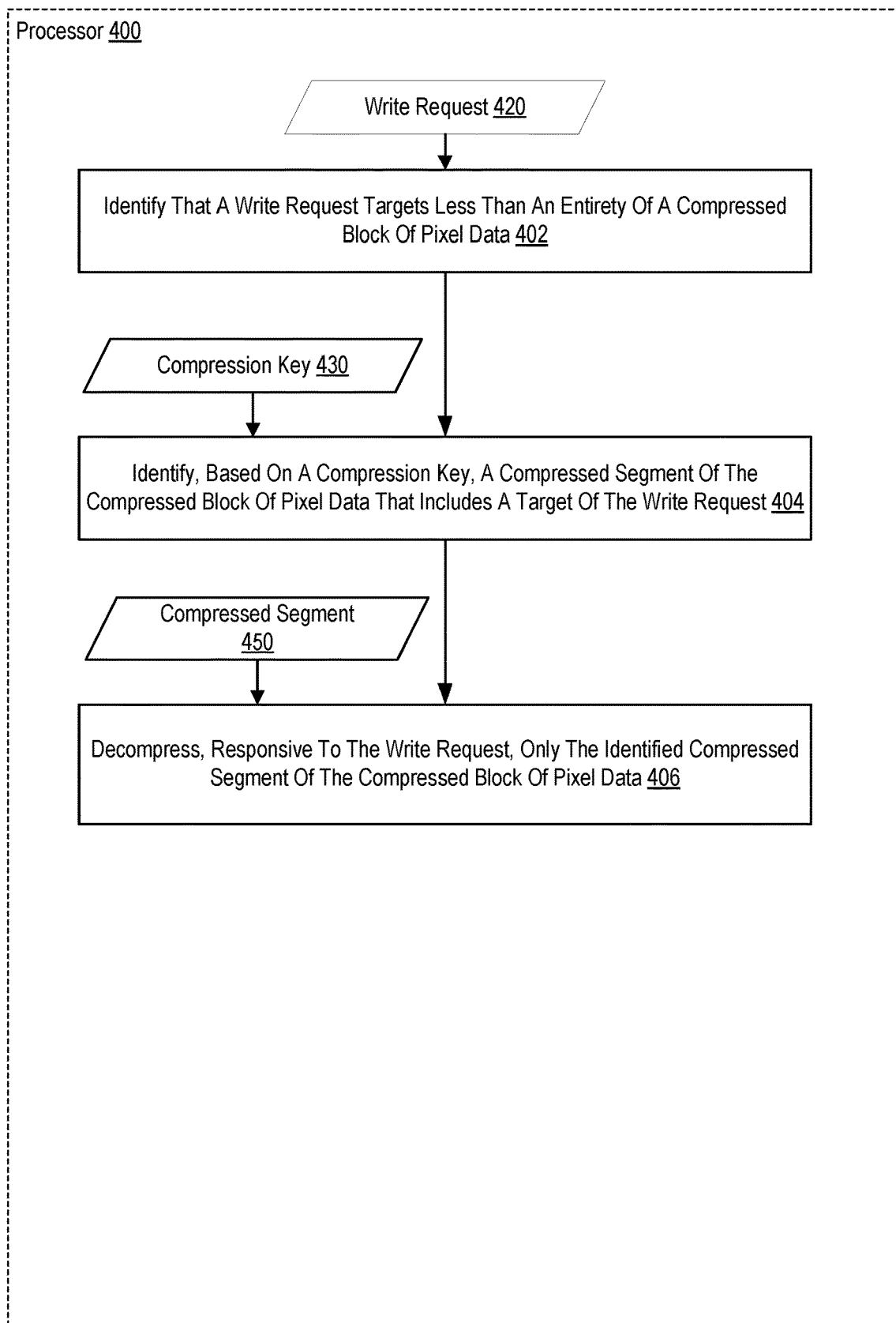
FIG. 4 is a flowchart of another example method of optimizing partial writes to compressed blocks according to some implementations of the present disclosure.

For further explanation, FIG. 4 sets forth a flow chart illustrating an example method of optimizing partial writes to compressed blocks in accordance with some implementations of the present disclosure. The example of FIG. 4 includes a processor 400, which is similar to the processor 200 discussed above, that maps portions of an uncompressed block of pixel data to compressed segments of a compressed blocks of pixel data stored in memory using a compression key. In some examples, a block of pixel data embodies surface texture of a rendered graphic, while a compressed block of pixel data corresponds to a block of a compressed surface. A compressed surface consumes less bandwidth when transferring surface texture data over the memory bus. In some implementations, as discussed above, a block of pixel data is partitioned into segments, where each segment is individually compressed to satisfy size constraints related to a unit of compressed data. For example, a limitation on compressed data size is implementation-dependent based on cache line size, bus width, or other characteristics of a particular implementation. However, it should be recognized that a compression ratio depends on the characteristics of the data being compressed, thus some blocks of pixel data can be compressed without partitioning while others may require partitioning to remain within a size threshold.

In some examples, a cache client, such as the shader units described above, issues a write request 420 to modify all or part of a block of pixel data. For example, the write request targets a block of pixel data by a memory address for that block of pixel data, or an address and an offset where a particular byte or sequence of bytes is to be modified (i.e., a partial write). In some implementations, a client is unaware as to whether a particular block of pixel data is compressed or uncompressed, and thus issues write requests based on an address space for uncompressed data. In practice, where the block of pixel data targeted by the write request is a compressed, the physical address of the compressed data is remapped to the address of the compressed block of pixel data. In some implementations, the write request 420 is a read-modify-write request, such that the write request 420 includes the write data for carrying out a modification to data that is either in the cache or that is read into the cache, without the need to first load the read data into processor registers.

In some examples, the write request 420 will either hit or miss on various levels of a cache hierarchy. If the write request 420 hits on a cache entry, the modification is performed by the cache on the cached data using the write data. If the write request 420 is a partial write, the particular bytes targeted by the write request are modified in a cache line. If the block of pixel data in the cache is compressed, it is first decompressed before the modification is made. If the write request 420 misses on all levels of the cache hierarchy, the block of pixel data is retrieved from memory. If the block of pixel data is uncompressed, portions of the block of pixel data targeted by the write request 420 are read into a cache line and the requested modification is made in the cache. However, if the write request 420 targets a portion of a compressed block of pixel data, the compressed block of pixel data is read from memory and decompressed by a compression unit before any modification is made.

The method of FIG. 4 includes identifying 402 that a write request 420 targets less than an entirety of a compressed block of pixel data. In implementations, cache logic determines whether a write request targets less than an entirety of the compressed block of pixel data based on an address or address and offset for the uncompressed block of pixel data indicated in the write request 420. As previously mentioned, an uncompressed block of pixel data is compressed to render the compressed block of pixel data. In some examples, the uncompressed block of pixel data is a fixed size. For example, where the fixed size of a block of pixel data is 256 bytes, the compressed block of pixel data logically represents 256 bytes of pixel data although the compressed block consumes less than 256 bytes of storage. A write request can target an entire block of pixel data or a subset of the pixel data in the block of pixel data (i.e., a location in the uncompressed block of pixel data). In some implementations, if data of the write request targets the entirety of the compressed block of pixel data, then a compression unit compresses the data of the write request without first decompressing a compressed block of pixel data. The compressed block that is stored in the cache or in memory is overwritten with the compressed data of the write request. If the write request targets only a portion of the compressed block, in that the write request modifies only a portion of the uncompressed block of pixel data, a mapping between the targeted portion of the uncompressed block of pixel data and the compressed block of pixel data is identified.

The method of FIG. 4 also includes identifying 404, based on a compression key 430, a segment 450 of the compressed block of pixel data that includes a target of the write request 420. In some implementations, the compression key 430 identifies a compressed block of pixel data and describes how the uncompressed block of pixel data was partitioned before compression. For example, in implementations, the compression key maps a byte range of the uncompressed block of pixel data to a compressed segment of the compressed block of pixel data. In implementations, the compression key 430 also indicates a location in a storage region at which each compressed segment is stored. For example, a write request that targets byte N in block A, where block A was partitioned into multiple segments prior to compression. In such an example, the compression key indicates which compressed segment includes byte N. In implementations, the compression key also indicates the memory address of the segment that includes byte N.

Consider an example of a 256-byte block of pixel data that is partitioned into two 128-byte segments (an upper segment and a lower segment) before compressing each 128-byte segment individually. In such an example, the compression key 430 indicates that data in a byte range of 0 to 127 of the uncompressed block of pixel data is stored in a first compressed segment of pixel data and data in a byte range of 128 to 255 of the uncompressed block of pixel data is stored in a second compressed segment of pixel data, where the uncompressed segments of pixel data are partitions of the uncompressed block of pixel data. Where a write request targets bytes 0-64 of the uncompressed block of pixel data, a mapping unit uses the compression key 430 to identify that the targeted byte range of the write request corresponds to the first compressed segment of pixel data. The compression key is also used to identify the memory location of the first compressed segment of pixel data. It should be recognized that the size of the uncompressed block of pixel data, the size and number of the uncompressed segments, and a size threshold for compressed units of data is provided for example and may differ according to implementation.

The example method of FIG. 4 also includes decompressing 406, responsive to the write request 420, only the identified compressed segment 450 of the compressed block of pixel data. In some implementations, to perform the partial write to the compressed data block, compression logic (e.g., the compression unit 208 of FIG. 2) decompresses only the compressed segment of the compressed block of pixel data that includes the target of the partial write. For example, where a partial write request targets byte N in block A, and where the compression key 430 indicates that compressed segment M includes byte N of block A, only compressed segment M is decompressed, while any other compressed segment associated with block A is not decompressed. In a particular example, the compressed segment is decompressed via DCC decoder.

Figure 5:
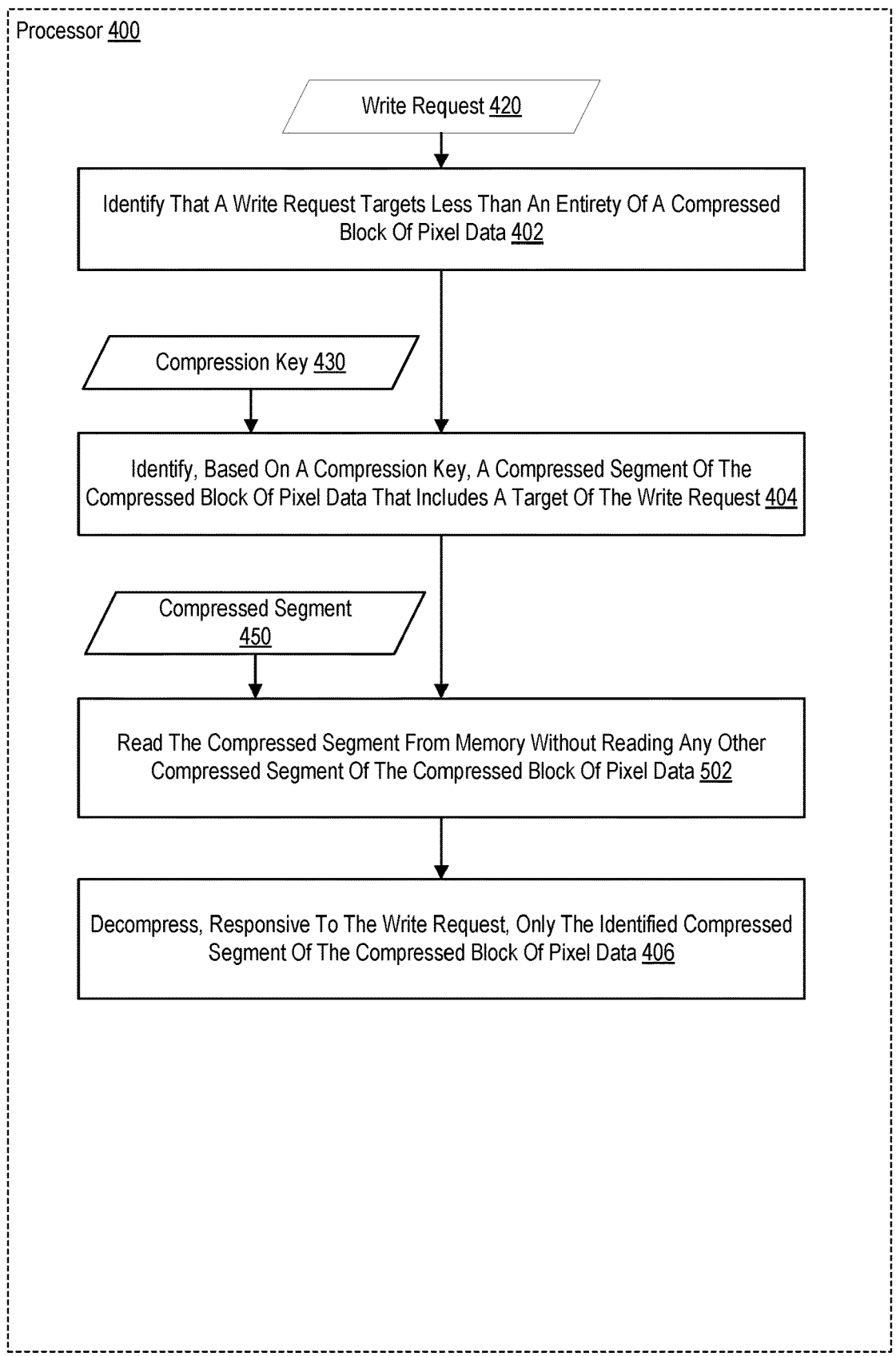
FIG. 5 is a flowchart of another example method of optimizing partial writes to compressed blocks according to some implementations of the present disclosure.

For further explanation, FIG. 5 sets forth a flow chart illustrating an example method of optimizing partial writes to compressed blocks in accordance with some implementations of the present disclosure. The example method of FIG. 5 is similar to the method of FIG. 4 in that it includes many of the same aspects. The method of FIG. 5 also includes reading 502 the compressed segment 450 from memory without reading any other compressed segment of the compressed block of pixel data. While in some examples, the compressed block of pixel data is located in the cache, in other examples, the compressed block of pixel data is located in memory and is read into the processor before decompression. In some implementations, to conserve memory bus bandwidth, only the compressed segment that includes the target of the partial write is read from memory. For example, the compressed segment is read into a cache line, a buffer, or other storage location to await decompression. In one example, where the compressed block of pixel data is not present in the cache, and where the write request only targets bytes N, only the compressed segment M that includes bytes Nis read from memory into the cache.

Figure 6:
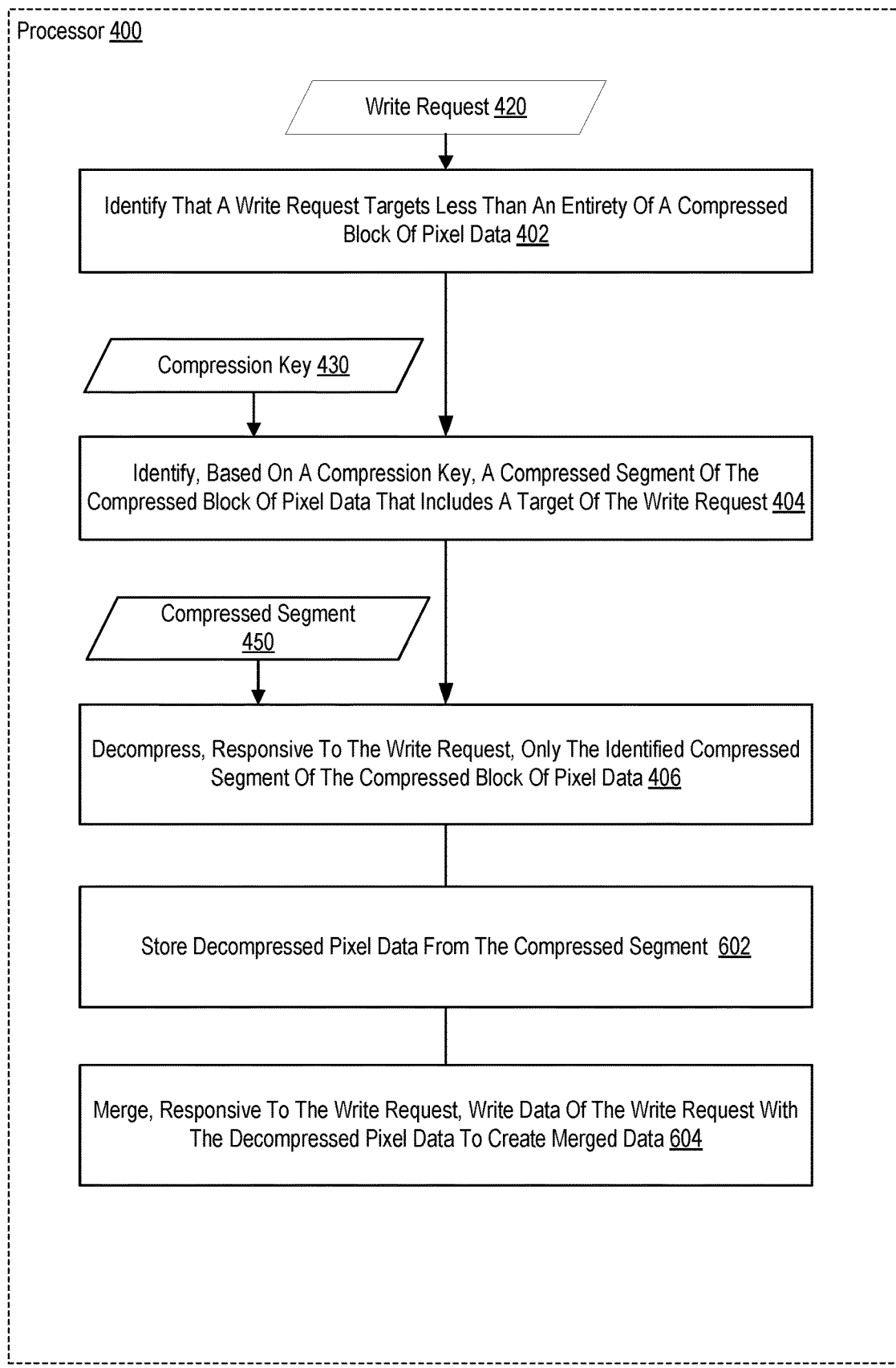
FIG. 6 is a flowchart of another example method of optimizing partial writes to compressed blocks according to some implementations of the present disclosure.

For further explanation, FIG. 6 sets forth a flow chart illustrating an example method of optimizing partial writes to compressed blocks in accordance with some implementations of the present disclosure. The example method of FIG. 6 is similar to the method of FIG. 4 in that it includes many of the same aspects. The method of FIG. 6 also includes storing 602 decompressed pixel data from the compressed segment 450 in a cache location. In some implementations, the decompressed pixel data resulting from the decompression of the compressed segment is stored in a cache location. In some implementations, the cache location is one or more lines of a cache, such as a last level cache. In one example, a compression unit decompresses the compressed segment 450 and writes the decompressed data into the cache location. In another example, decompression logic in the cache decompresses the compressed segment.

The method of FIG. 6 also includes merging 604, responsive to the write request 420, write data of the write request 420 with the decompressed pixel data in the cache location. In some implementations, where the write request overwrites only a portion of the decompressed pixel data from the compressed segment, the write data of the write request is merged with the other unaffected portions of the decompressed pixel data. In some examples, the merging of the write data and the unaffected portions of the decompressed pixel data is carried out by merge logic in the cache.

Figure 7:
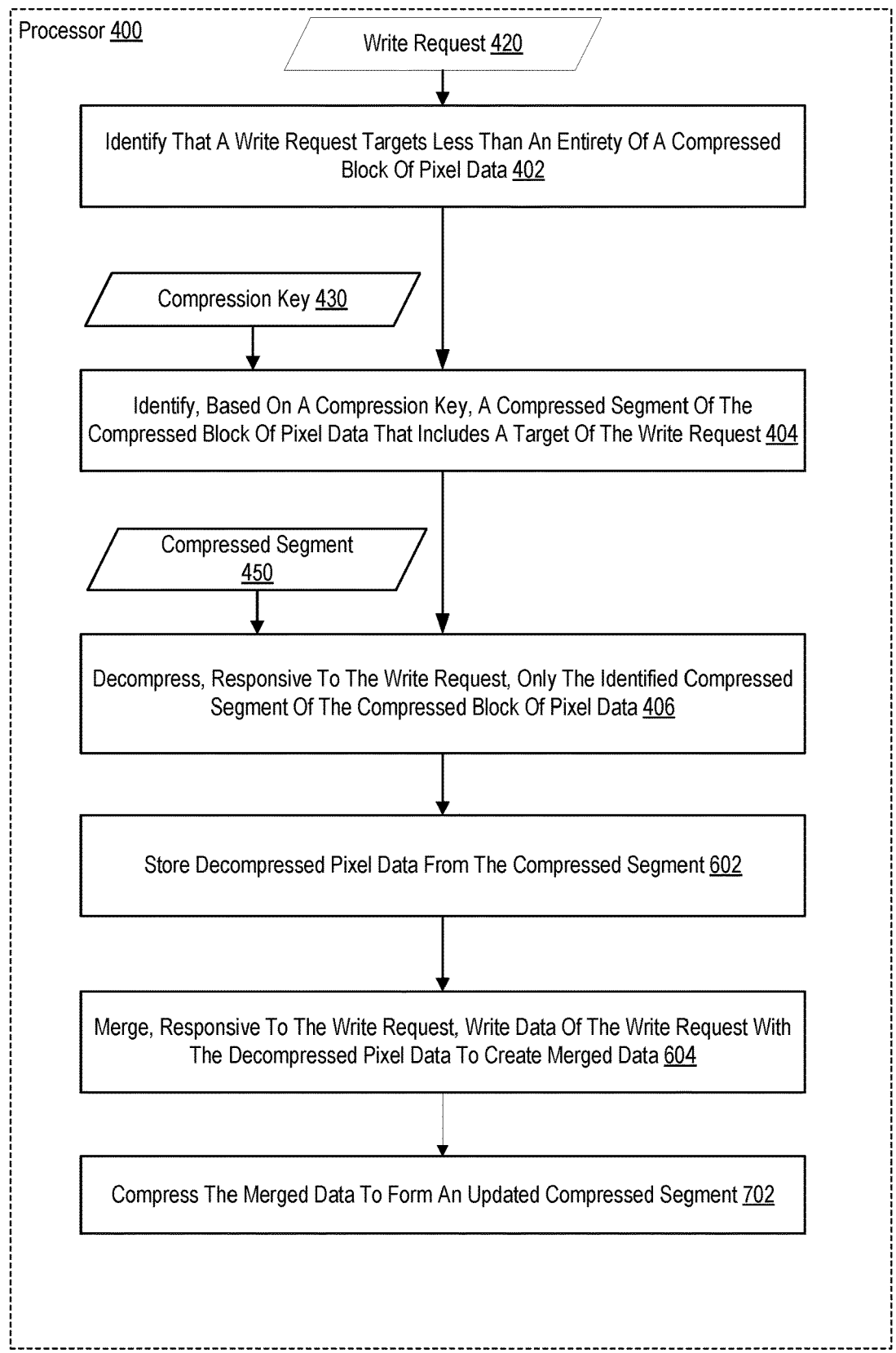
FIG. 7 is a flowchart of another example method of optimizing partial writes to compressed blocks according to some implementations of the present disclosure.

For further explanation, FIG. 7 sets forth a flow chart illustrating an example method of optimizing partial writes to compressed blocks in accordance with some implementations of the present disclosure. The example method of FIG. 7 is similar to the method of FIG. 6 in that it includes many of the same aspects. The method of FIG. 7 also includes compressing 702 the merged data in the cache location to form an updated compressed segment. In some implementations, the data in the cache location that includes the merger of the write data and decompressed pixel data is compressed via DCC. The result of the compression is an updated version of the original compressed segment 450. The updated compressed segment includes the modification made by the partial write and will be incorporated into the compressed block of pixel data. In this way, the compressed block is modified without decompressing the entirety of the compressed block. In various examples, the updated compressed segment is written back to the cache and/or to a location in memory.

Figure 8:
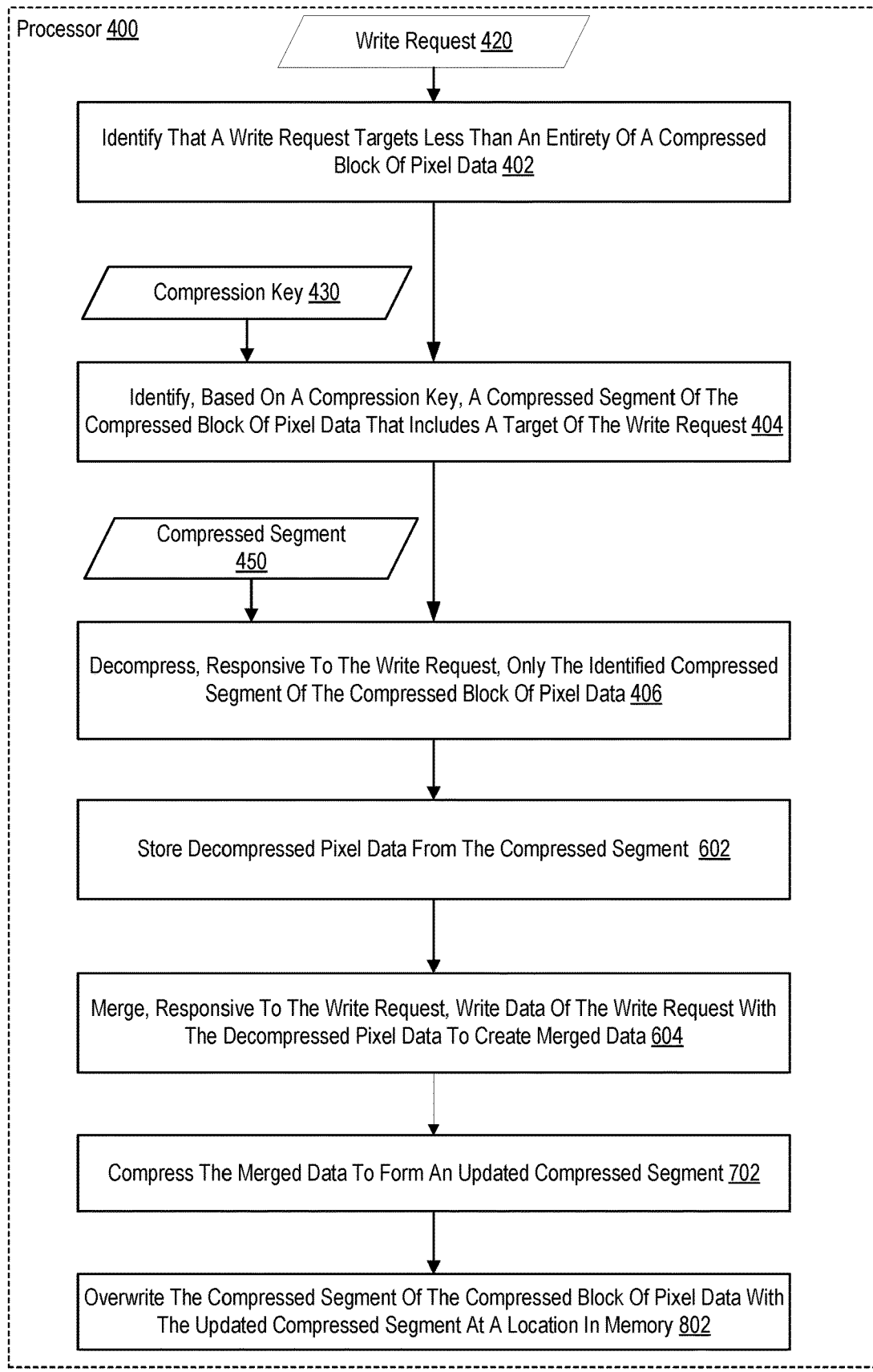
FIG. 8 is a flowchart of another example method of optimizing partial writes to compressed blocks according to some implementations of the present disclosure.

For further explanation, FIG. 8 sets forth a flow chart illustrating an example method of optimizing partial writes to compressed blocks in accordance with some implementations of the present disclosure. The example method of FIG. 8 is similar to the method of FIG. 7 in that it includes many of the same aspects. The method of FIG. 8 also includes overwriting 802 the compressed segment 450 of the compressed block of pixel data with the updated compressed segment at a location in memory. In some implementations, the updated compressed segment is written to memory either by the compression unit or as part of a cache flush/eviction. In either case, an older instance of the compressed segment is overwritten with the updated compressed segment. The location to which the updated compressed segment is written can be contiguous with memory locations of other compressed segments that make up the compressed block.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. An apparatus comprising:
   a processor configured to:
   decompress, responsive to a write request identifying a target location in an uncompressed block of pixel data, only a particular compressed segment of a compressed block of pixel data based on a data structure that maps the particular compressed segment to the target location in the uncompressed block of pixel data, wherein the uncompressed block of pixel data has been partitioned into two or more segments prior to compression based on a maximum compressed block size.

2. The apparatus of claim 1, wherein the processor is further configured to:
   read the particular compressed segment from memory without reading any other compressed segment of the compressed block of pixel data.

3. The apparatus of claim 1, wherein the processor is further configured to:
   store decompressed pixel data from the particular compressed segment; and
   merge, responsive to the write request, write data of the write request with the decompressed pixel data to create merged data.

4. The apparatus of claim 3, wherein the processor is further configured to:
   compress the merged data to form an updated compressed segment.

5. The apparatus of claim 4, wherein the processor is further configured to:
   overwrite the particular compressed segment of the compressed block of pixel data with the updated compressed segment at a location in memory.

6. The apparatus of claim 1, wherein the processor is further configured to:
   identify that a compressed size of a block of pixel data is larger than a preconfigured threshold;
   partition the block of pixel data into two or more segments;
   compress the block of pixel data by individually compressing each of the two or more segments; and
   generate, based on the partitioning, the data structure for the compressed block of pixel data.

7. The apparatus of claim 1, wherein the compressed block of pixel data is compressed using delta color compression.

8. The apparatus of claim 1, wherein the processor includes a mapping unit configured to:
   identify that the write request targets less than an entirety of the compressed block of pixel data; and
   identify, based on the data structure, the particular compressed segment of the compressed block of pixel data that includes the target of the write request.

9. The apparatus of claim 1, wherein the processor includes a decoder configured to decompress, responsive to the write request, only the particular compressed segment of the compressed block of pixel data.

10. The apparatus of claim 1, further comprising a memory that stores the compressed block of pixel data.

11. The apparatus of claim 1, wherein the data structure includes an identifier for a compressed block of pixel data, a type of compression that was used to compress the uncompressed block of pixel data, a number of compressed segments in the compressed block of pixel data, a size of each compressed segment, a byte range within the uncompressed block of pixel data that is corresponds each compressed segment, and a memory location of one or more compressed segments.

12. An apparatus comprising:
    a processor configured to:
    identify that a compressed size of a block of pixel data is larger than a preconfigured threshold;
    partition the block of pixel data into two or more segments;
    compress the block of pixel data by individually compressing each of the two or more segments; and
    generate, based on the partitioning, a compression key for the compressed block of pixel data.

13. The apparatus of claim 12, wherein the processor includes an encoder configured to:
    identify that the compressed size of the block of pixel data is larger than the preconfigured threshold;
    partition the block of pixel data into the two or more segments;
    compress the block of pixel data by individually compressing each of the two or more segments; and
    generate, based on the partitioning, the compression key for the compressed block of pixel data.

14. The method of claim 13, wherein the data structure includes an identifier for a compressed block of pixel data, a type of compression that was used to compress the uncompressed block of pixel data, a number of compressed segments in the compressed block of pixel data, a size of each compressed segment, a byte range within the uncompressed block of pixel data that is corresponds each compressed segment, and a memory location of one or more compressed segments.

15. A method for optimizing a partial write to a compressed block, the method comprising:
decompressing, responsive a write request identifying a target location in a uncompressed block of pixel data, only a particular compressed segment of a compressed block of pixel data based on a data structure that maps the particular compressed segment to the target location in the uncompressed block of pixel data, wherein the uncompressed block of pixel data has been partitioned into two or more segments prior to compression based on a maximum compressed block size.

16. The method of claim 15 further comprising:
reading the particular compressed segment from memory without reading any other compressed segment of the compressed block of pixel data.

17. The method of claim 15 further comprising:
storing decompressed pixel data from the particular compressed segment; and
merging, responsive to the write request, write data of the write request with the decompressed pixel data to create merged data.

18. The method of claim 17 further comprising:
compressing the merged data to form an updated compressed segment.

19. The method of claim 18 further comprising:
overwriting the particular compressed segment of the compressed block of pixel data with the updated compressed segment at a location in memory.

20. The method of claim 15 further comprising:
identifying that a compressed size of a block of pixel data is larger than a preconfigured threshold;
partitioning the block of pixel data into two or more segments;
compressing the block of pixel data by individually compressing each of the two or more segments; and
generating, based on the partitioning, the data structure for the compressed block of pixel data.

\* \* \* \* \*